United States Patent [19]
Guyer

[11] Patent Number: 6,053,418
[45] Date of Patent: Apr. 25, 2000

[54] SMALL-SCALE COGENERATION SYSTEM FOR PRODUCING HEAT AND ELECTRICAL POWER

[75] Inventor: Eric C. Guyer, Dover, Mass.

[73] Assignee: Yankee Scientific, Inc., Medfield, Mass.

[21] Appl. No.: 09/070,435

[22] Filed: Apr. 30, 1998

Related U.S. Application Data

[63] Continuation-in-part of application No. 09/007,262, Jan. 14, 1998.

[51] Int. Cl.[7] ..................................................... B60H 1/02
[52] U.S. Cl. ............................................................ 237/12.1
[58] Field of Search ............................... 237/13, 19, 9 R, 237/8 A, 2 R, 2 A, 12.1

[56] References Cited

U.S. PATENT DOCUMENTS

| | | | |
|---|---|---|---|
| 1,551,438 | 8/1925 | Staley | 126/101 |
| 2,130,894 | 9/1938 | Muir | 126/101 |
| 2,596,968 | 5/1952 | Harris et al. | 60/105 |
| 2,822,136 | 2/1958 | Dalin | 237/17 |
| 2,827,893 | 3/1958 | Ribaudo et al. | 126/101 |
| 2,833,268 | 5/1958 | Warren | 126/101 |
| 3,198,190 | 8/1965 | Gordon | 126/101 |
| 3,219,831 | 11/1965 | Ray et al. | 237/12.1 |
| 3,393,515 | 7/1968 | Tabor et al. | 60/64 |
| 4,061,131 | 12/1977 | Bohanon | 126/271 |
| 4,124,178 | 11/1978 | Burke | 237/19 |
| 4,210,102 | 7/1980 | Dosmann | 122/20 B |
| 4,298,311 | 11/1981 | Ritzi | 415/80 |
| 4,344,569 | 8/1982 | Gardner . | |
| 4,369,917 | 1/1983 | Schnell | 237/12.1 |
| 4,418,538 | 12/1983 | Heinrich | 60/646 |
| 4,437,308 | 3/1984 | Fischer | 60/514 |
| 4,474,018 | 10/1984 | Teagan | 62/79 |
| 4,768,495 | 9/1988 | Zifferer | 126/101 |
| 5,046,478 | 9/1991 | Clawson | 126/110 R |
| 5,243,825 | 9/1993 | Lin | 62/238 |
| 5,544,645 | 8/1996 | Armijo et al. | 126/101 |
| 5,727,396 | 3/1998 | Boyd et al. | 62/323.1 |

OTHER PUBLICATIONS

Product Brochure from Iron Fireman Manufacturing Co. entitled *"Individual Thermostatic Control of Temperature in each Room"*, Copr. 1954.

*"Application, Installation and Service Manual for the SelecTemp Modulating Zone Heating"*, from Turbonics, Inc., publication date unknown.

*Primary Examiner*—Harold Joyce
*Assistant Examiner*—Derek S. Boles
*Attorney, Agent, or Firm*—Cesari and McKenna, LLP

[57] ABSTRACT

A self-powered heating system includes a boiler for generating steam, an expander for extracting mechanical and electrical energy from the steam and a heat exchanger for transferring heat energy from the steam to room air. A fan mounted adjacent to the heat exchanger forces room air to be heated past the heat exchanger and through the space being heated. An electric pump returns condensate from the heat exchanger to the boiler. The mechanical and electrical power for operating the fan and pump are provided by the expander. In particular, the expander extracts mechanical energy from the low pressure steam supplied by the boiler to power the fan and includes a magneto for generating an alternating current which may be converted to a direct current for powering the pump. The electrical power generated by the magneto is also sufficient to power a steam valve to the expander and a fuel valve regulating fuel flow to the burner. In another embodiment, the system includes a high pressure water heater for small-scale cogeneration of heat and electrical power. The high pressure hot water is expanded to obtain mechanical energy for driving a generator and, thereby, producing a supply of electrical power. Hot water and steam from the expander are passed through a condenser to transfer heat to a supply of secondary water. The heated secondary water may then be used for space heating purposes.

38 Claims, 7 Drawing Sheets

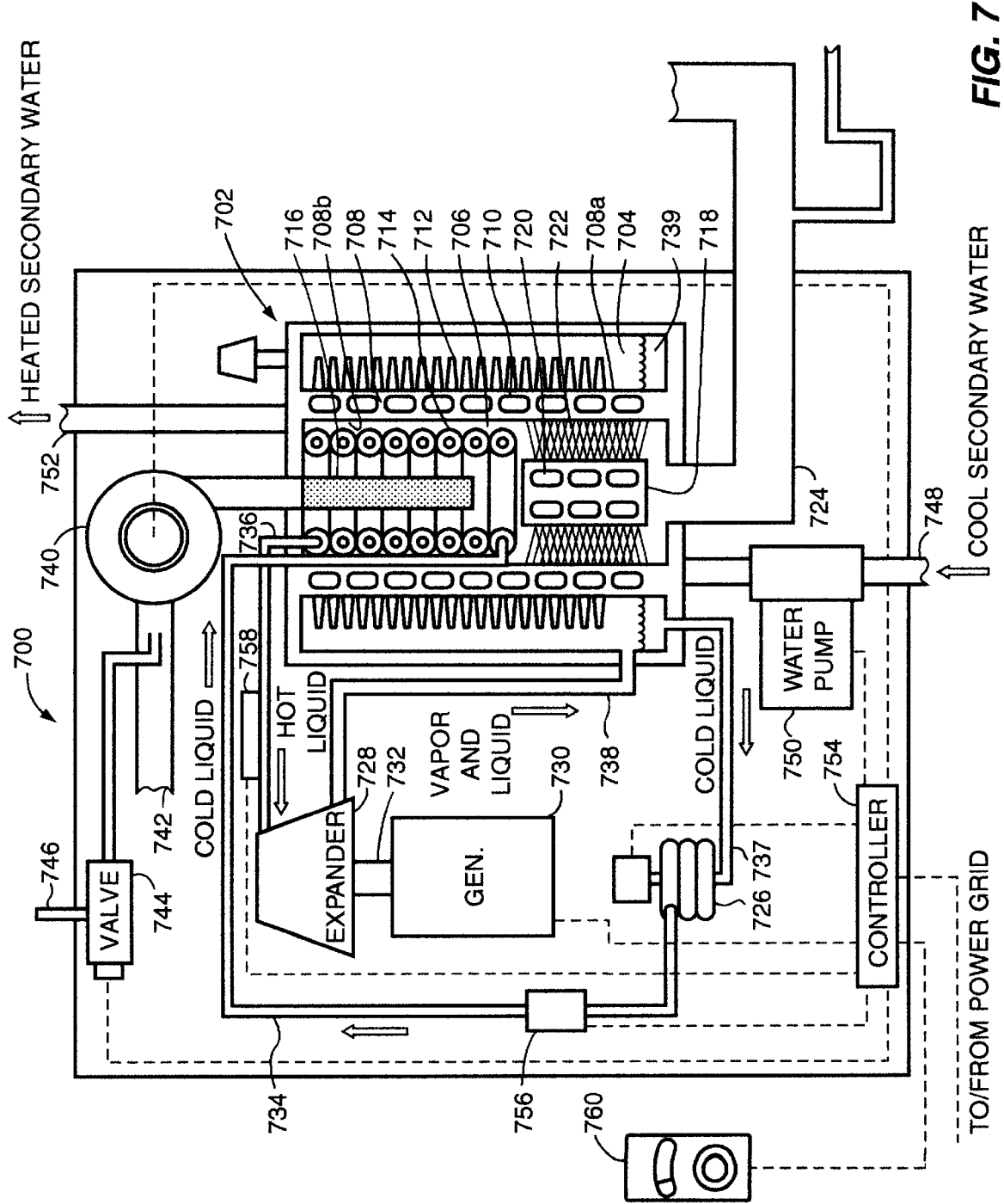

SMALL-SCALE COGENERATION SYSTEM FOR PRODUCING HEAT AND ELECTRICAL POWER

This application is a continuation-in-part of application Ser. No. 09/007,262, filed Jan. 14, 1998.

FIELD OF THE INVENTION

The present invention relates generally to heating systems, and more specifically, to a small-scale cogeneration system for providing heat and electrical power.

BACKGROUND OF THE INVENTION

Electrically Operated Furnaces

Many commercial buildings as well as homes are heated by forced hot air furnaces. These furnaces typically include an oil or gas-fired burner, a heat exchanger, and an air blower or fan. The heat exchanger typically comprises a plurality of passageways through which hot combustion gases flow. The fan is mounted next to the heat exchanger such that cool air may be forced past the heat exchanger and heated. The fan, which is typically powered by an electric motor, also moves the heated air through the building or home via an arrangement of ducts leading to the various rooms. An electric thermostat operably connected to the burner and the fan is often used to control the furnace. The thermostat switches the furnace on (e.g., activates the burner and the fan) whenever the temperature at the thermostat falls below a preselected level. Operation of the furnace brings warm air into the home. When the temperature at the thermostat exceeds another preselected level, the thermostat shuts the furnace off, thereby suspending the flow of heated air.

One of the main disadvantages of such furnaces is their dependence on electricity. As described above, such furnaces generally include an electrically powered fan to move air past the heat exchanger and through the building or home being heated. In addition, electric power is often used to operate the thermostat and to control the burner. For a 100,000 Btu/hour residential forced hot air furnace, for example, the electric power requirement is typically between 0.5 to 1.0 kilowatts. Annual electric power costs for operating such a furnace are in the range of $75 to $150. Furthermore, if the electricity delivered to the furnace is interrupted for whatever reason, the furnace is rendered inoperable. That is, without electric power, the thermostat, the burner and the motor that drives the fan will not work, thereby stopping the flow of warm air to the space(s) being heated.

Electric power, moreover, is often lost in blizzards or other cold weather storms. The concomitant loss of the furnace's heating ability, during such periods when the demands for heat are large, can have serious consequences. For example, if the power is disrupted for any length of time, the building or home can become so cold as to be uninhabitable. In addition, the temperature in the building or home may fall below freezing, causing water pipes to burst. The resulting water damage can be substantial.

In addition to hot air heating systems, many older homes and buildings use a steam heating system. With these systems, steam from the boiler is distributed to a series of radiators disposed throughout the building using its own pressure energy. However, the cost of steam distribution systems is relatively high compared to modern forced hot air heating systems. Additionally, forced hot air systems can be easily modified to provide both heating and air conditioning. Accordingly, for reasons of economy and convenience, forced hot air is now the most widely used heating system, despite the disadvantage described above.

One heating system that combined aspects of both steam heating and forced hot air heating was the SelecTemp system from Iron Fireman Manufacturing Company. As shown in the Application, Installation and Service Manual, the SelecTemp system, which has not been in production for many years, included a central steam boiler that provided steam to each of the rooms being heated. A mini heat exchanger and fan combination was located in each room. Steam from the boiler was delivered to the heat exchanger and to a small turbine that operated the fan. The steam was thus utilized to power the fan and to generate the heat that was subsequently forced into the room by the small fan. Condensate from each heat exchanger and fan combination drained back to the boiler in a return piping system that was separate from the steam supply piping. The condensate was collected in a common sump at atmospheric pressure and was returned to the central boiler by a pump. The pump was either powered electrically or by the steam produced from the boiler (e.g., by another small turbine with its own steam supply line). Although the SelecTemp system, including the steam-powered return pump, was not dependent on electricity, it was disadvantageous for several reasons.

First, the configuration of multiple heat exchangers in separate rooms and a common sump precluded the system from being operated or producing heat at more efficient vacuum steam temperatures and pressures. That is, in order to equalize the pressure at each heat exchanger and thereby ensure the return of condensate to the sump, the SelecTemp system specifically required that the condensate pump be vented to atmospheric pressure. By venting the condensate pump to atmospheric pressure, the heat exchangers were forced to operate at or somewhat above atmospheric pressure. For boilers manufactured in accordance with the American Society of Mechanical Engineers (ASME) Pressure Vessel and Boiler Code (Section IV, Heating Boilers), moreover, the maximum steam pressure that may be generated by such boilers is about 10 psia. Accordingly, the corresponding pressure ratios at the turbines was relatively low, and thus the available pressure energy that could be extracted to drive the fans was extremely limited.

Another major disadvantage of the SelecTemp system is that the boiler must be maintained at or near its full working pressure and temperature in order for the system to provide heat. That is, to achieve condensation at the heat exchangers (which operated at or somewhat above atmospheric pressure) and thereby heat the rooms, the steam being supplied to the heat exchangers needed to be at least 212 degrees Fahrenheit and positive pressure (relative to atmospheric). Once the boiler stopped producing positive pressure steam at 212 degrees Fahrenheit, the heat transfer process ceased. Accordingly, the energy used to heat the boiler to generate steam at its operating pressure and temperature, which was often substantial due to the large mass of most cast iron boilers, was not available for heating the building. A significant amount of heat energy supplied by the burner was thus never realized.

The SelecTemp system was also relatively complex and expensive to manufacture, install and maintain. In particular, the system included a separate heat exchanger, fan, turbine, and control valve in each room within the space being heated. These numerous working parts, which were dispersed throughout the building, added to the system's complexity and cost. The SelecTemp system further required that steam be provided (typically by ¼ inch copper tubing) to each room, resulting in significant thermodynamic losses. In addition, in order to drain accumulating condensate from these lines, steam traps were required, which were prone to leakage, thereby causing additional problems.

The SelecTemp system also did not lend itself to easy installation in existing homes as a replacement furnace, especially for forced hot-air furnaces. That is, the system was typically a completely new installation requiring substantial construction work to provide steam pipes running from the boiler to the heat exchanger/fan combination in each room. Thus, one could not readily convert an existing, conventional forced hot-air furnace to the SelecTemp system.

U.S. Pat. No. 4,418,538 represents an improvement over the SelecTemp system. This system includes a fuel burner fired vapor generator, a turbine, and a condenser. The improvement relates to a mechanism for using vapor pressure within the system to activate a starting valve for releasing vapor (e.g., steam) to the turbine. More specifically, a mechanical valve between the vapor supply and the turbine does not open until an adequate vapor pressure to operate the turbine is attained. Since the turbine powers a fan which blows cool air over the condenser, the release of vapor within the system, including the condenser, before the turbine can power the fan could cause the condenser to overheat. This improvement, however, adds considerable complexity and cost to the system and, therefore, fails to represent an affordable self-powered forced hot air heating solution. The system also fails to include any mechanism for air cooling and/or dehumidification (i.e., air conditioning), even though the vast majority of today's central air space conditioning systems are implemented with both heating and cooling function.

Heat and Electrical Power Cogeneration Systems

The use of large-scale steam-powered stations for the cogeneration of heat and electric power are also known. Many centralized power production facilities, for example, burn coal or oil to generate high pressure/high temperature steam which, in turn, is used to run one or more generators for providing several megawatts of electrical power. This power may then be supplied to a public power grid or within a campus of buildings. The high pressure/high temperature steam may also be used for space heating purposes. That is, remaining heat energy from the steam, after powering the electric generator(s), may also be provided to neighboring buildings. The steam may then be used for space heating purposes within the buildings.

These large-scale systems (i.e., on the order of several megawatts) typically operate on the well-known Rankine steam cycle. To achieve acceptable fuel efficiency levels, steam boiler producing steam at high pressures (e.g., on the over 500 pounds per square inch) are required. These boilers typically include a relatively large free surface area for separating the vapor phase (i.e., steam) from the liquid phase (i.e., water), generating a large inventory of high pressure high temperature water within the boiler. In addition, complex control systems and heavy wall construction boilers are needed to safely manage the steam. Accordingly, the resulting systems are typically quite large in size and demand constant supervision to ensure safe operation. Indeed, an explosion at theses pressures and temperatures can be catastrophic.

Although these systems are adequate for large-scale operation, they are not suitable for use in most residential or small commercial buildings where the electric power requirements are on the order of 1 to 20 kilowatts. First, the need for a large vapor/liquid surface area and water inventory and a boiler capable of withstanding the high steam pressures and temperatures demands a system far too large and expensive for practical small-scale installations. The ASME code, moreover, prohibits the practical installation of steam boilers operating at these high pressures in residential settings. Additionally, owners of such systems would be unwilling to provide the needed supervision to ensure safe operation. Indeed, there is no system presently available for providing safe and economical delivery of electrical power and heat on a small-scale (i.e., on the order of 2 to 20 kilowatts) using a high pressure steam boiler. Indeed, no other means of routinely generating both heat and electrical power on a small-scale, such as internal combustion engines, has been widely adopted due to cost and operating difficulties.

SUMMARY OF THE INVENTION

It is an object of the present invention to provide a self-powered, forced air, central space heating system that does not require electricity.

It is a further object of the present invention to provide an efficient, self-powered heating system that is less costly to install and maintain than the prior art systems.

It is a further object of the present invention to provide a small-scale system for cogenerating heat and electrical power for residential or small commercial uses.

Briefly, the invention relates to a self-powered heating system including a boiler for generating steam, an expander for extracting mechanical and electrical energy from the steam and a heat exchanger for transferring heat energy from the steam to room air. The boiler preferably includes a burner extending at least partially therein. Steam from the boiler is supplied to the expander and the heat exchanger which are preferably within the same housing as the boiler or at least disposed in close proximity thereto. A fan or blower mounted adjacent to the heat exchanger forces room air to be heated past the heat exchanger and through the space being heated. An electric pump returns condensate from the heat exchanger to the boiler. Significantly, the mechanical and electrical power for operating the fan and pump are provided by the expander. In particular, the expander receives low pressure steam from the boiler and expands it to a pressure preferably below atmospheric thereby extracting sufficient mechanical energy to power the fan. The expander further includes a magneto for generating an alternating current which may be converted to a direct current for powering the pump. The electrical power generated by the magneto is also sufficient to power a steam valve to the expander and a fuel valve regulating fuel flow to the burner. Accordingly, the forced hot air heating system of the present invention is not dependent upon an external supply of electrical power in order to provide heat from a central source. Instead, the system operates solely on the low-pressure steam provided from the boiler.

During operation, a call for heat is provided when the temperature at a thermostat falls below a selected level, thereby activating the burner and causing the boiler to generate steam. The steam powers the expander which, in turn, drives the fan and operates the magneto. Steam exhausted from the expander is condensed in the heat exchanger in order to heat room air being forced across the heat exchanger by the fan, which also delivers the warm air throughout the building via an arrangement of ducts. Condensate exiting the heat exchanger is then returned to the boiler by the pump. When the temperature at the thermostat exceeds another preselected level, the burner is deactivated, eventually suspending the delivery of warm air.

Significantly, the operating fluid (i.e., water and steam) is sealed from the atmosphere. Accordingly, at any point in the system, steam pressures above and below atmospheric pressure (i.e., vacuum pressure) may be present. The ability to operate over a range of pressures including vacuum pressures, moreover, permits the generation of sufficient mechanical energy to power a central fan or blower and sufficient electrical power to operate a pump and other electric components, unlike the prior art systems. In addition, the boiler is capable of generating useful steam for operating the expander and delivering heat to the building even after the burner is deactivated and the boiler begins to cool down.

The system may also be used to provide air conditioning. In particular, the fan may force air to be cooled past an evaporator coil. Power to operate the fan during air conditioning may be provided by an electric motor running off of the local electric grid. Additionally, the system may heat a domestic hot water supply. In this embodiment, steam generated by the boiler may be selectively provided to a coil disposed within a hot water supply tank. By circulating steam through the coil, the water in the tank may be heated. Hot water may then be drawn out of the tank and replaced with cold water. Steam or condensate exiting the coil is then returned to the boiler.

The invention further relates to a small-scale cogeneration system. In this embodiment, a high pressure water heater is utilized instead of a steam boiler. In particular, the system includes a high pressure water pump which provides high pressure water to the heater where it is heated to near its saturation or boiling point. The hot, high pressure water is then provided to an expander which extracts mechanical energy in order to run a generator. Steam and hot water exiting the expander is then provided to a condenser. A fan or blower is preferably mounted proximate to the condenser for forcing room air past the condenser so that it may be heated. The fan is powered by the electrical energy supplied by the generator. Condensate exiting the condenser is returned to the pump, which is also powered by the generator. In another embodiment, the condenser includes an outer jacket having a continuous passageway formed therein. A second water supply that is segregated from the high pressure water flowing through the heater and expander is pumped through the passageway in the jacket. As vapor condenses in the condenser, the water flowing through the passageway is heated. This heated secondary water is then available for space heating purposes.

BRIEF DESCRIPTION OF THE DRAWINGS

The above and further advantages of the invention may be better understood by referring to the following description in conjunction with the accompanying drawings, in which:

FIG. 7 is a block diagram of yet another embodiment of a small-scale cogeneration system.

DESCRIPTION OF THE PREFERRED EMBODIMENT

Figure 1:
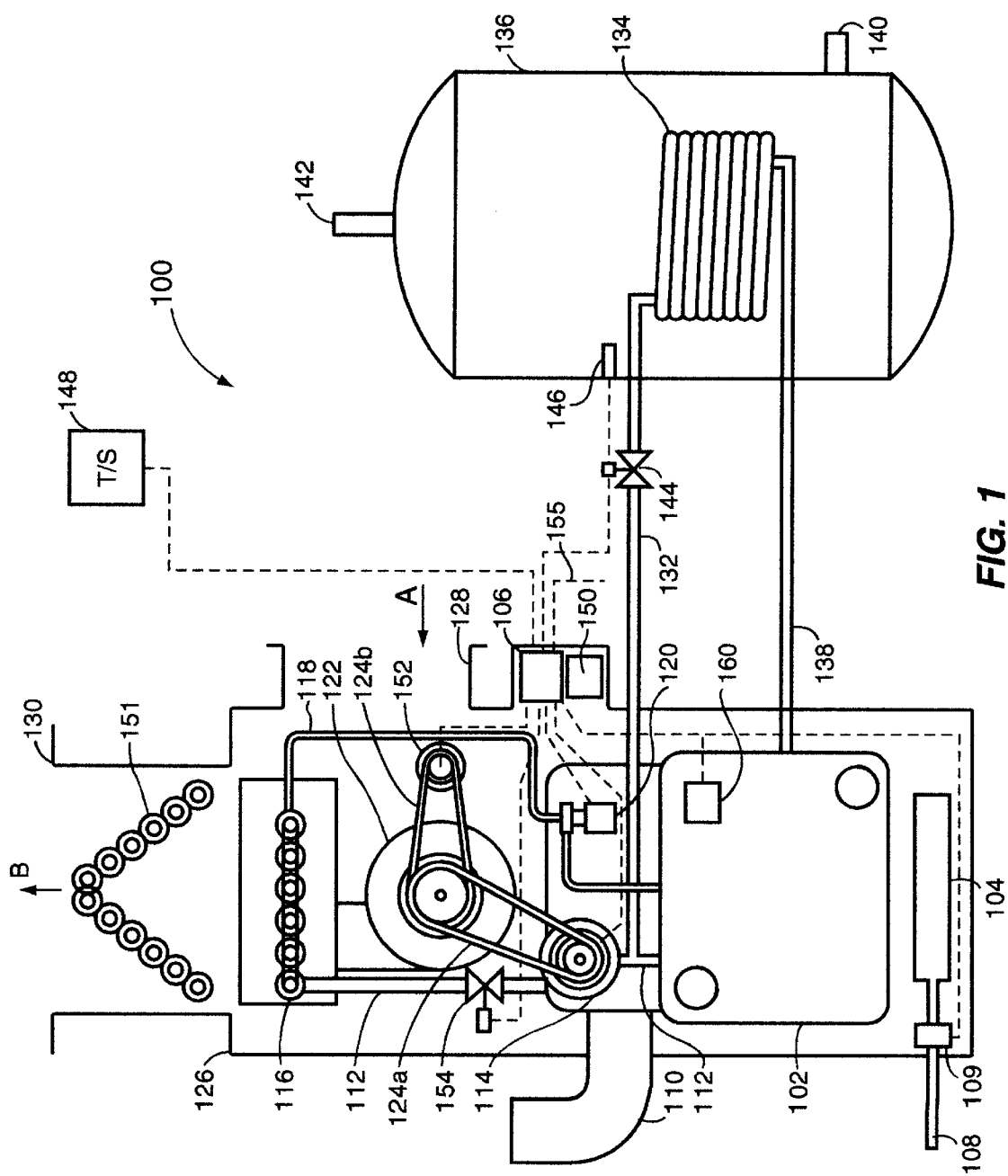
FIG. 1 is a block diagram of a self-powered heating system in accordance with the present invention.

FIG. 1 illustrates a self-powered heating system 100 in accordance with the present invention. The heating system 100 includes a boiler 102 for generating steam. Extending into the boiler 102 is a burner 104. The burner 104 preferably burns a gaseous hydrocarbon fuel which may be provided by a gas line 108 and regulated by a fuel valve 109, which may be activated by a controller 106. Nonetheless, it should be understood that alternative fuels may also be used. The controller 106 is connected to a thermostat 148 which may be located within a room in the space being heated. Exhaust products resulting from the combustion of fuel by the burner 104 are preferably disposed via an exhaust stack 110. Steam generated by the boiler 102 preferably exits via a supply line 112. The steam supply line 112 is connected to an expander 114 and then to a steam condensing heat exchanger 116. A return line 118 carries condensate exiting the heat exchanger 116 back to the boiler 102 through a condensate pump 120. Lines 112 and 118, together with expander 114, heat exchanger 116 and pump 120, represent the circulation path for the working fluid (e.g., water-steam) utilized by the heating system 100. An electrically operated valve 154, moveable between an open and a closed position, governs the flow of steam from the boiler 102, through the expander 114, and to the condenser 116.

The expander 114 is used to power a central fan or blower 122 having an exhaust adjacent to the heat exchanger 116. The expander 114 may be operably connected to the fan 122 via a first endless belt 124a such that rotation of the expander 114 under the supply of steam from the boiler 102 drives the fan 122. The expander 114 can be any type of positive displacement or turbo-dynamic device for converting steam pressure energy to mechanical power, such as a reciprocating piston engine, turbine, or rotary vane "motor". For the typical installation of system 100 (e.g., a residential or small commercial building), expander 114 preferably produces approximate 0.75 kW of power to drive the fan 122. A suitable expander for use in the present invention may be of a design similar to that of a conventional rotary sliding vane motor operated with compressed air, especially those designed to operate with no lubrication. Such a compressed air motor would need to be converted to operate on steam. An electric motor 152 may be connected to the fan 122 by a second endless belt 124b. Operation of the electric motor 152 is governed by the controller 106, as discussed below.

It should be understood that other means besides an arrangement of endless belts 124a, 124b may be used to supply power from the expander 114 or motor 152 to the fan 122. For example, a series of gears, a direct shaft coupler, or an electric generator/motor set may be used to transmit power from the expander 114 to the fan 122. The boiler 102, moreover, is preferably built to the standards of the ASME Pressure Vessel and Boiler Code Section IV.

The boiler 102, expander 114, heat exchanger 116, pump 120 and fan 122 are all preferably disposed within a single housing 126. The housing 126 includes an air inlet 128 for receiving room air to be heated and an air outlet 130. The air outlet 130, in turn, is connected to an arrangement of ducts (not shown) which lead to one or more of the various rooms of the space being heated. Accordingly, the entire heating system 100 (not including the ducts) may be located in a single room (e.g., the basement) of the space being heated, unlike to the prior art SelecTemp system.

Figure 2:
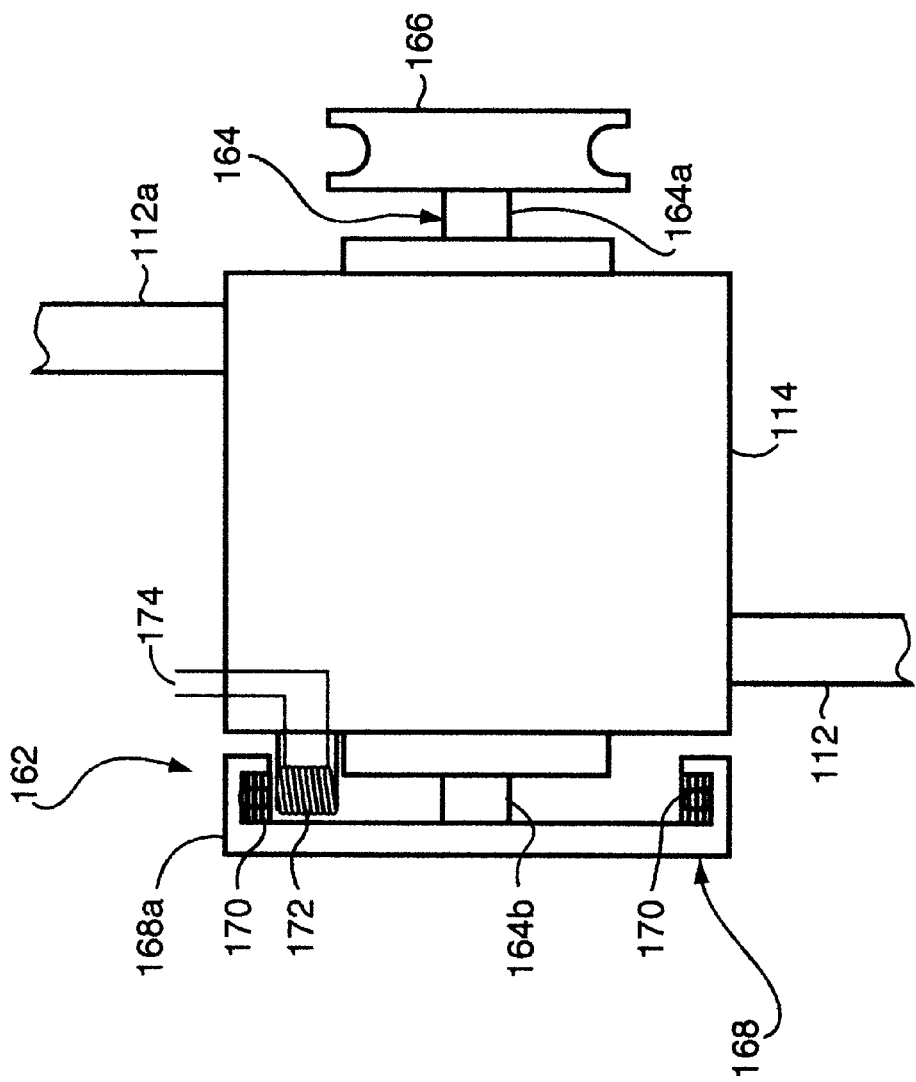
FIG. 2 is a partial block diagram of the expander of FIG. 1, illustrating the magneto and mechanical drive components.

FIG. 2 is a partial block diagram of the expander 114, which includes a magneto 162 for generating low output (e.g., typically less than 50 watts) alternating current with an unregulated frequency. More specifically, the expander 114 includes a rotating shaft 164 powered by the low pressure steam entering the turbine at supply line 112a. At a first end 164a of the shaft 164 is a drive belt pulley 166 for operating the fan 122 (FIG. 1) via endless belt 124a. Mounted to a second end 164b of the shaft 164 opposite the pulley 166 is an armature 168 having an outer periphery 168a. A pair of oppositely aligned permanent magnets 170 are preferably disposed within the outer periphery 168a of the armature 168. In addition to the magnets 170, the magneto 162 also includes at least one stator coil 172 that may be mounted to the expander 114 and is thus fixed relative to the rotating magnets 170. The stator coil 172 is preferably positioned so that the magnets 170 pass in close proximity to the coil 172 during rotation of the armature 168, thereby generating an alternate current within the coil 172. The alternating current produced by the coil 172 of the magneto 162 is provided to the controller 106 (FIG. 1) via leads 174. The controller 106, moreover, includes conventional circuitry for converting the alternating current to direct current for operation of the controller 106, the condensate pump 120, steam valve 154, and burner fuel valve 109. Since the total power demand for these several control loads can be less than 50 watts, it is well within the power capability of the magneto 162. Magnetos of similar design are commonly used with internal combustion engines for generating low levels of electric power to operate ignition systems, lights, and other electrical controls and devices. The design and manufacture of such magnetos is well known and will not be discussed herein.

Figure 3:
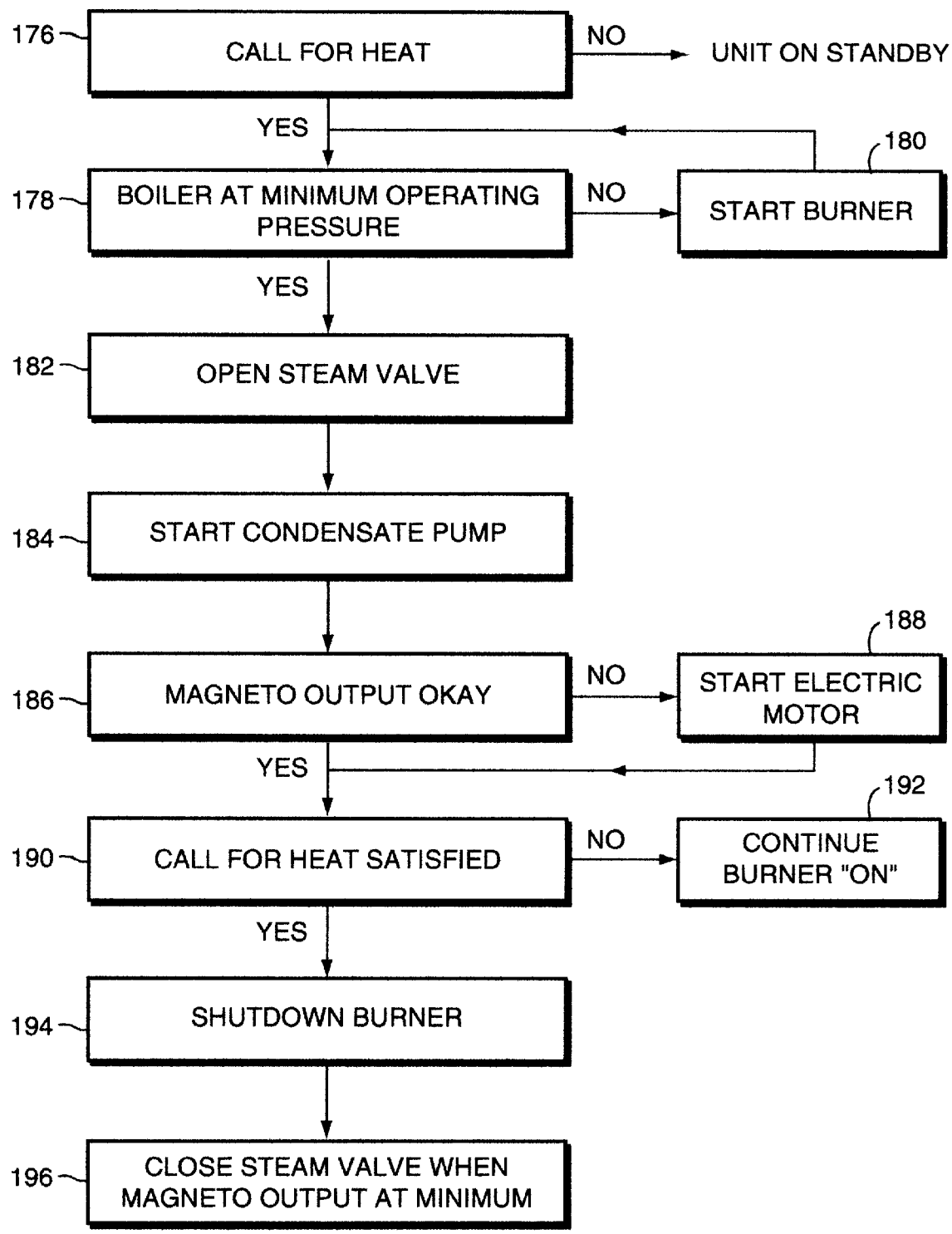
FIG. 3 is a flow chart of the operating logic of the heating system of FIG. 1.

FIG. 3 is a flow chart of the operating logic of the system 100. In operation, when the temperature at the thermostat 148 (FIG. 1) falls below a preselected level, it issues a call for heat message, as indicated by block 176. In response, the controller 106, at block 178, determines whether the boiler 102 is already at its operating pressure via a pressure sensor 160 (FIG. 1) extending into the boiler 102. Assuming the pressure in the boiler 102 is below the minimum operating pressure (e.g., a cold start), controller 106 activates the burner 104, as shown at block 180. During periods of normal availability of local grid power, the controller 106 accesses such power through a power line 155 (FIG. 1) to start the system 100. A battery 150 (FIG. 1), connected to the controller 106, is also provided for starting the system 100 during periods of electric power interruption. The controller 106 includes conventional circuitry for recharging the battery 150 using the electrical power from the magneto 162 (FIG. 2). Thus, the system 100 can continue to operate through an indefinite number of operating cycles, while local grid power is interrupted. When local grid power is available, the battery 150 is preferably maintained at charge by conventional recharging circuitry within the controller 106 and, so as not to cause an undue cycling of the battery 150, a small amount of grid power is preferably used by the controller 106 to start the system 100.

Activation of the burner 104 causes water in the boiler 102 to be heated, thereby producing steam which exits the boiler 102 through the supply line 112. The boiler 102 preferably generates steam at an operating pressure of 7 to 15 psig. The controller 106 preferably maintains the valve 154 in a closed position until the boiler 102 has reached a steam pressure that is sufficient to operate the expander 114, at which point the controller 106 opens the valve 154 and starts the condensate pump 120, as indicated by blocks 182 and 184, respectively. Upon reaching the expander 114, the steam causes the expander 114 to spin. Rotation of the expander 114 drives the fan 122 via endless belt 124a, causing cool air to be drawn into the housing 126 through the air inlet 128 as shown by arrow A. Rotation of the expander 114 also causes the magneto 162 (FIG. 2) to generate alternating current which is received at the controller 106 and converted to direct current power.

Due to the extraction of mechanical energy, the outlet steam pressure at the expander 114 is lower than the inlet steam pressure. After leaving the expander 114, the lower pressure steam flows to the heat exchanger 116. The heat exchanger 116 may comprise a network of closely spaced hollow tubes through which the steam flows and condenses. The boiler 102, supply line 112, return line 118 and pump 120 (i.e., the circulation path), are preferably hermetically sealed and the heat exchanger 116 is preferably configured to run at vacuum steam pressure (relative to atmospheric pressure). For example, heat exchanger 116 may operate (i.e., condense steam) at steam pressures below 14.7 psia, which is the standard value for atmospheric pressure. As cool air is forced past the tubes of the heat exchanger 116 by fan 122, it is heated. The heated air is then forced, again under operation of the fan 122, through the air outlet 130 as shown by arrow B and into at least some of the various rooms of the space being heated.

Heat transfer occurring at the heat exchanger 116 causes the steam disposed therein to condense. The condensate exiting the heat exchanger 116 is then returned to the boiler 102. The pump 120, which is coupled to the return line 118, forces low pressure condensate exiting heat exchanger 116 back to the higher pressure boiler 102, completing the cycle of the working fluid.

During operation, the controller 106 monitors the output of the magneto 162, as indicated by block 186 (FIG. 3). If the output of the magneto 162 falls below a prescribed level (indicating a possible malfunction in which the expander 114 may not have sufficient output to drive the fan 122), the controller 106 starts the electric motor 152, as shown by block 188. When the temperature at the thermostat rises above a preselected level, it issues another message indicating that the previous call for heat has been satisfied, as indicated by block 190. Until the call for heat satisfied message is sent, controller 106 continues to run the burner 104, as needed, in order to maintain operating steam pressure, as shown by block 192.

In response to the call for heat satisfied message, the controller 106 closes the fuel valve 109 deactivating the burner 104, as indicated by block 194. With the burner 104 deactivated, the boiler 102 begins to cool down. Nonetheless, even as it cools down, the boiler 102 will continue to produce steam and the valve 154 is kept open, although the pressure of the steam being produced at this point will be less than the maximum operating pressure of the boiler 102. This lower pressure steam is still provided to the expander 114 and heat exchanger 116, as described above. Since the expander 114 is able to expand the steam to pressures below atmospheric through the closed nature of the circulation path, the expander 114 is still able to extract sufficient energy from this lower pressure steam to drive the fan 122 and operate the magneto 162. Similarly, the steam exiting the expander 114 will still have sufficient pressure and temperature to allow the heat exchanger 116 to heat room air.

For example, heat exchanger 116 is preferably configured to condense steam at a saturation pressure of at least as low as 7 psia. The condensing temperature of steam at 7 psia, moreover, is approximately 175° F. Assuming return air from the building enters the heat exchanger at approximately 70° F., a sufficient temperature differential still exists to heat room air to 140° F., which is the desired operating temperature. Expander 114 is also configured to power the fan 122 whenever the pressure being produced by the boiler is above the minimum saturation pressure for useful operation of the heat exchanger (e.g., 7 psia). As a result, continued heating may take place even though the burner 104 has been deactivated. In fact, the system 100 may continue to provide heat transfer until the pressure at the heat exchanger 116 falls below approximately 3 psia.

At some point, the steam exiting the boiler 102 will not have sufficient pressure to drive the expander 114 or condense within the heat exchanger 116, stopping the flow of warm air to the space being heated. Further cooling of the boiler 102, moreover, will suspend the production of steam entirely. As indicated by block 196, when the output of the magneto 162 drops below a prescribed level, the controller 106 preferably closes the steam valve 154. Nonetheless, as shown, the present system 100 is able to extract a significant portion of the heat energy used to heat the boiler to its operating temperatures and pressures and use this energy to heat the corresponding space. System 100 is thus much more efficient than prior designs.

Referring to FIG. 1, the system 100 also includes an air conditioning evaporator coil 151 as is customary with forced air central space conditioning systems. The evaporator coil 151 is preferably disposed within the air outlet 130 downstream of the condenser 116. The evaporator coil 151 carries coolant supplied by conventional air conditioning components (not shown) connected to the coil 151. The controller 106 provides for operation of the fan 122 through electric motor 152 for air cooling and dehumidification by the evaporator coil 151. The controller 106 may use power from the local grid to operate motor 152. To improve efficiency, both the electric motor 152 and the steam expander 114 preferably include conventional overrunning clutches (not shown) to prevent unnecessary rotation and power consumption when the corresponding component is not in use.

The system 100 may also be used to produce a supply of hot water. Here, a separate feed pipe 132 is connected to the supply line 112 carrying steam from the boiler 102. The feed pipe 132 provides steam to a heating coil 134 disposed inside a hot water tank 136. A return pipe 138 transfers condensate exiting the heating coil 134 to the boiler 102. Water to be heated is provided to the tank 136 via an inlet 140. As water in the tank 136 flows around the coil 134, it is heated. Hot water may then be drawn out of the tank 136 via an outlet 142. A steam valve 144 may be disposed in the feed pipe 132 to shut off or adjust the flow of steam being provided to the coil 134 in the tank 136.

The controller 106 may be utilized to adjust and/or maintain the temperature of the water in the tank 136. In particular, the controller 106 may be operably connected to the valve 144 and a temperature sensor 146 disposed within the tank 136. When the temperature of the water in the tank 136 falls below a preset value, the controller 106 preferably moves the valve 144 from a closed to an open position, allowing steam to flow to the coil 134 and heat the water in tank 136. When the temperature of the water in the tank 136 reaches another level, the controller 106 preferably closes the valve 144.

It should be understood that the controller 106 may alternatively activate the burner 104, causing the boiler 102 to generate steam that is then supplied to the coil 134. Similarly, the controller 106 may de-activate the burner 104, thereby suspending the flow of steam to the coil 134.

As set forth herein, the present invention is a completely self-powered, space heating system requiring no outside electrical power. That is, the system 100 will continue to produce heat despite a loss of electrical power to the home or building being heated. The system 100 also provides a supply of hot water, again without relying on electricity. Furthermore, as shown in the illustrative embodiment of FIG. 1, the system 100 requires few parts and is substantially refined and improved over the prior art systems. Notably, the system 100 allows for operation with vacuum steam pressures, thereby significantly increasing the power output of the expander 114. As a result, the available power of present system 100 is about double that of the prior art SelecTemp system for the same air heating temperature condition. Furthermore, at different times during operation of the system, the pressure in the boiler and the heat exchanger may both be above atmospheric pressure, both be below atmospheric pressure, or in a state where the pressure in the boiler is above atmospheric while the pressure in the heat exchanger is below atmospheric pressure.

The use of a vacuum heat exchanger 116 specifically makes feasible the configuration of the system 100 wherein the steam from a low pressure boiler 102 can produce enough mechanical power to operate a central forced air heating system (e.g., a central fan). That is, as previously mentioned, heat exchanger 116 is preferably configured to provide steam condensation at pressures below atmospheric pressure. Also, since the heat exchanger 116 and the expander 114 are all preferably located in close proximity to the boiler 102 (e.g., within the single housing 126), the thermal losses experienced with the prior art systems are avoided and installation and maintenance is simplified. The system 100 may also be readily installed as a replacement system in buildings with preexisting forced hot-air furnaces, since the system 100 can utilize the existing arrangement of ducts.

The system 100 also has the advantage of utilizing practical and reliable electric power controls and components to achieve efficient system operation. For example, the electric motor 152, in addition to operating the fan 122 for air cooling and dehumidification, also provides a back-up power drive for the fan 122 during the heating season. Thus, during the vast majority of the year when electric power is available from the local grid, any failure of the expander 114 or the drive belt 124a can be automatically compensated by switching to the electric motor 152 to drive the fan 122. Also, should the magneto 162 fail to generate sufficient power for operation of the pump 120 when local grid power is available, the controller 106 preferably includes conventional circuitry to switch to local grid power as a back-up.

The mechanical decoupling of the feed pump 120 from the expander 114 also provides important operational advantages in comparison to prior art systems. For example, the pump 120 can be started before opening steam valve 154 in order to achieve a reduced pressure in the condenser 116. This will result in a faster startup of the expander 114 to full power capacity once the valve 154 is opened. The use of a low-cost, commercially available, electrically actuated valve 154 also avoids a complicated use of pressure diaphragms, mechanical linkages and interlocks as required by the prior art systems. Similarly, the use of the electric fuel valve 109 with a spark burner ignition as opposed to the millivolt thermoelectric fuel valves with standing pilot flame of prior art systems increases energy efficiency.

Thus, taken all together, system 100 represents a significant improvement over prior art designs, since it provides for high heating reliability through operating system redundancy, while preserving the desired feature of sustained operation during electrical power outages. System 100 also significantly reduces electrical power consumption during the heating season. Electric motor 152, moreover, provides heating function redundancy and space cooling and dehumidification as needed during summer periods. Also, the system 100 may incorporate a high capacity water heating component, thus avoiding the need for a separately fired water heater, which typically has much lower heating power rating than boiler 102. Additionally, the system 100 is more ideally configured to take advantage of low-cost electronic controls than the prior art systems, since the use of electric power is not completely abandoned. Specifically, the system 100 is amenable to the use of various electronic display lights and indicators commonly used in modern appliances.

Figure 4:
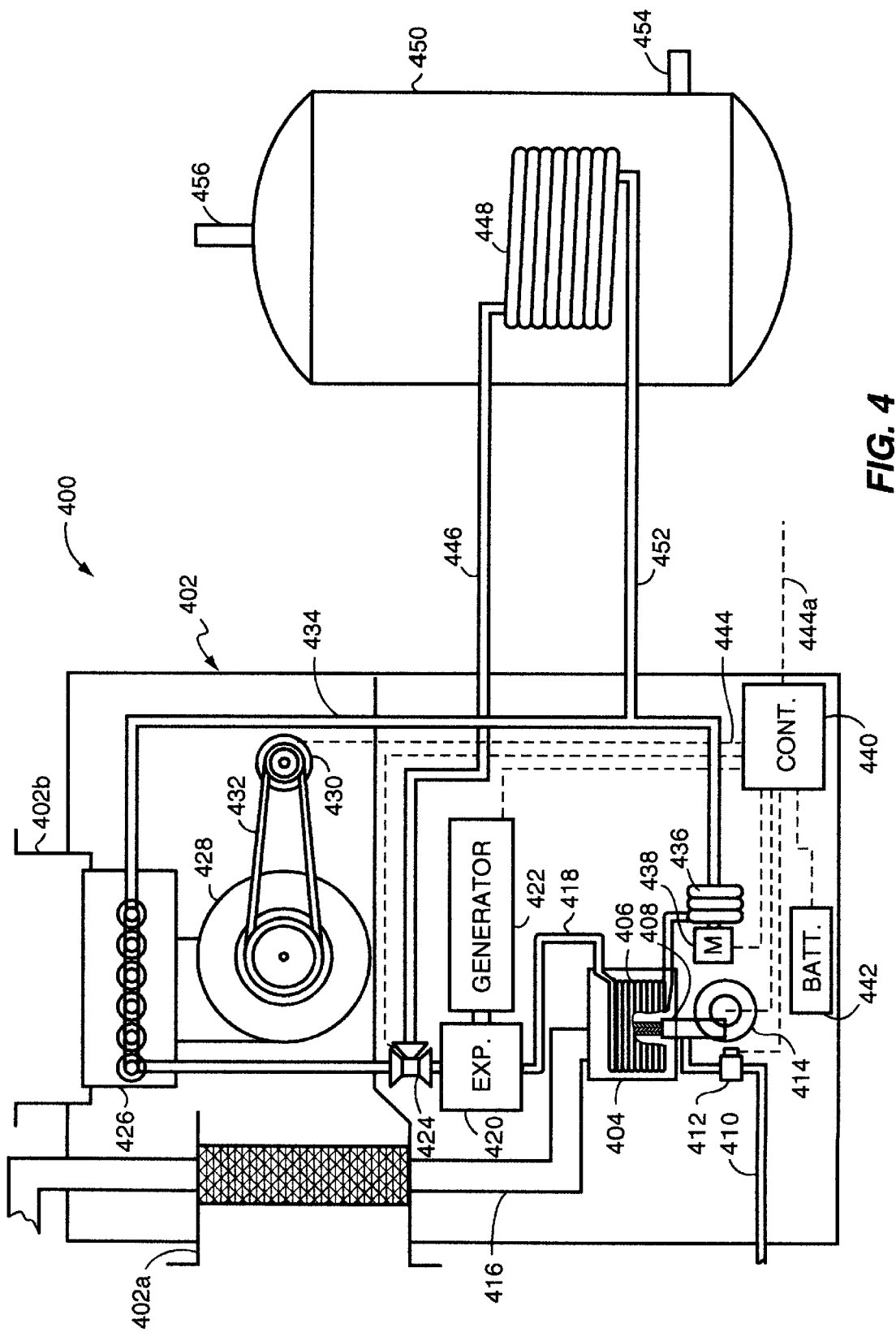
FIG. 4 is a block diagram of a small-scale cogeneration system for providing heat and electrical power in accordance with the present invention.

FIG. 4 is a block diagram of a small-scale cogeneration system 400 in accordance with the present invention. The cogeneration system 400 includes a high pressure heater 404 (as opposed to a low pressure boiler). Disposed within the heater 404 is a heating element 406 through which a fluid, such as water, flows at high pressure. Heating element 406 is preferably formed from a small diameter helical coil having fins to improve heat transfer. A burner 408 extends at least partially into the heater 404. Burner 408 preferably operates on a gaseous hydrocarbon fuel which may be provided by a gas line 410 and regulated by a fuel valve 412. Combustion air may be provided under pressure to burner 408 by a combustion air fan 414 which also forces combustion gases through the heater 404 and into an exhaust stack 416. It should be understood that the burner 408 may also operate under natural draft conditions.

Heating element 406 of heater 404 is preferably connected to an expander 420 by means of a supply line 418 so that high pressure, hot water may flow from element 406 to the expander 420. The expander 420, in turn, is operably coupled to a generator 422. Hot water and/or steam exiting the expander 420 preferably passes through a three-way valve 424 and is delivered to a condenser 426. A central air blower 428 is preferably disposed adjacent to the condenser 426. The heater 404, expander 420, generator 422, condenser 426 and blower 428 are all preferably mounted within a housing 402 having an air inlet 402a and an air outlet 402b. In particular, the central air blower 428 and the condenser 426 are preferably arranged within the housing 402 so that the blower 428 may draw cool room air into the housing 402 via air inlet 402a and force it past the heat exchanger 426 and out the air outlet 402b. The air outlet 402b, moreover, is preferably connected to an arrangement of ducts (not shown) which lead to one or more of the various rooms of the space being heated. The central air blower 428 may be powered by an electric motor 430 which is operably coupled thereto (e.g., by endless belt 432).

A return line 434 connects the condenser 426 to the heater 404 so that condensate exiting the condenser 426 may be returned to the water heater 404. A high-pressure pump 436, preferably disposed within the return line 418, maintains the water in the heater 404 at a high pressure, (e.g., in excess of 100 psia). The pump 436 is preferably powered by an electric pump motor 438. The cogeneration system 400 further includes a controller 440 that is coupled to the generator 422 for receiving electrical power therefrom. The controller 440 is also operatively connected to the valve 424, electric motor 430, pump motor 438 and a battery 442, as shown by dashed lines 444. As described below, controller 440 governs the operation of the cogeneration system 400 and provides supplemental electric power to a utility grid (not shown) via electric outlet line 444a. Controller 440 is preferably coupled to a thermostat (not shown) disposed in the space being heated.

In response to a call for heat from the thermostat, the controller 440 activates the combustion fan 414 and the pump 438 and opens the fuel valve 412. To perform these functions, controller 440 may utilize a small amount of power from the electric utility grid via line 444a. If electric power is unavailable (e.g., during a power outage), controller 440 may utilize electric power stored in the battery 442 to start the system 400, as described above. Fuel entering the burner 408 is ignited thereby heating the high pressure water disposed in the heating element 406 of heater 404. Burner 408, combustion fan 414 and heater 404 are all preferably configured so as to heat the water in element 406 to a temperature near the boiling point for the corresponding operating pressure (e.g., 467 F° at 500 psia). High pressure, hot water exits the heater 404 at supply line 418 and enters the expander 420 which extracts mechanical energy from the high pressure, hot water, thereby reducing the pressure (e.g., to 7 psia) and causing at least a portion thereof to be flashed to steam. Mechanical energy extracted by expander 420 is used to drive the generator 422. That is, the expander 420 is preferably coupled to the generator 422 by suitable means (e.g., a drive shaft, belt, etc.) so as to run the generator 422. Operation of the generator 422 by the expander 420 results in a supply of electrical power which is provided to the controller 440. Once the controller 440 begins to receive electrical power from the generator 422, it no longer needs to rely on the electric utility grid or the battery 442 to operate the system 400.

The expander 420 can be of a positive displacement or turbo-dynamic device design for converting high pressure, hot water to mechanical power, such as a rotary vane or screw motor similar to that described in U.S. Pat. No. 4,437,308 entitled Rotary Heat Engine the specification of which is hereby incorporated by reference in its entirety or a turbine similar to that described in U.S. Pat. No. 4,298,311 entitled Two-Phase Reaction Turbine the specification of which is hereby incorporated by reference in its entirety. Since a portion of the high pressure, hot water will flash to team during expansion, the expander should be capable of operating under two-phase low (i.e., water and steam).

Hot water and steam exiting the expander 420 is then provided to the condenser 26 and is condensed in order to heat room air being forced past the condenser 426 by the blower 428. In particular, the controller 440, utilizing electric power from generator 422, activates the blower motor 430 which, in turn, runs the blower 428. Operation of the blower 428 draws room air into the air inlet 402a and forces it past the heat exchanger 426 heating it. Warm room air is then distributed throughout the space being heated by the ducts coupled to the air outlet 402b. Condensate exiting the heat exchanger 426 flows back to the heater 404 via return line 434. Pump 436 preferably maintains the water pressure in the heater 404 at the desired value (e.g., 500 psia).

As shown, cogeneration system 400 is capable of supplying both heat and electric power on a small-scale (e.g., on the order of 1 to 20 kilowatts). In other words, by utilizing high pressure, hot water, system 400 is able to generate excess electrical power beyond the needs of the electrical components included therein. This excess electrical power may be utilized by the corresponding home or building and/or supplied to the corresponding electrical power grid. To improve efficiency, a portion of the exhaust stack 416 may be positioned proximate to the air inlet 402a so as to preheat the room air entering the heating system 400. The controller 440, moreover, may be configured to recharge the battery 442 while electrical power is being supplied by the generator 422.

The cogeneration system 400 may also be configured to heat a domestic supply of water with a portion of the hot water and steam exiting the expander 420. In particular, a feed pipe 446 may be connected to the valve 424 so as to divert some or all of the water or steam exiting the expander 420 to a heating coil 448 disposed in a hot water tank 450. A return pipe 452 transfers condensate exiting the heating coil 448 to the return line 434. Water to be heated is provided to the tank 450 via an inlet 454. As water in the tank 450 flows around the coil 448, it is heated. Hot water may then be drawn out of the tank 450 via an outlet 456. The valve 424, which may be electrically activated, preferably adjusts the flow of hot water and steam being provided to the coil 448 under the command of controller 440.

It should be understood that, for a given pressure, the efficiency with which mechanical energy may be extracted from steam is greater than the efficiency with which mechanical energy may be extracted from hot water. As described above, however, a cogeneration system utilizing high pressure steam (e.g., above 100 psia) would be extremely expensive and present significant risk of injury should a failure occur. Nonetheless, the efficiency with which mechanical energy can be extracted from high pressure, hot water is sufficient for operating a small-scale cogeneration system. For example, the thermodynamic efficiency of a two phase (water and steam) system having a 500 psia heater and a 7 psia heat condenser is nearly two-thirds of the efficiency of a steam cycle system operating at the same pressures. Accordingly, a high pressure water system, as described above, although slightly less efficient than a steam cycle system can be economically designed and manufactured and is far safer to operate than high pressure steam systems.

Figure 5:
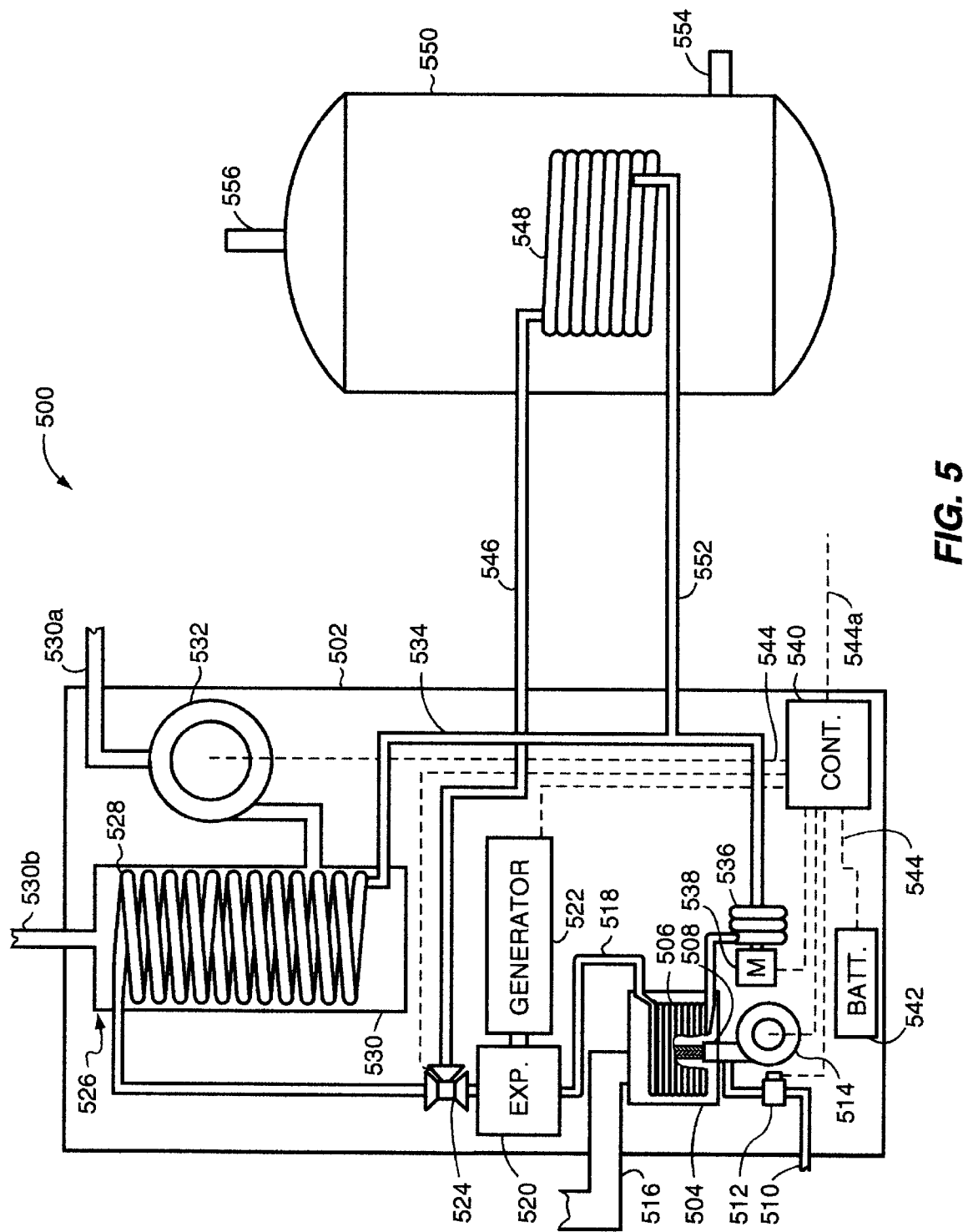
FIG. 5 is a block diagram of another embodiment of a small-scale cogeneration system.

FIG. 5 is a block diagram of another small-scale cogeneration system 500. System 500 similarly produces a supply of electrical power as described with reference to FIG. 4, but also provides a supply of hot water (as opposed to forced hot air) for use in heating the corresponding space. Specifically, the cogeneration system 500 includes a water heater 504 having a high pressure heating element 506 and a burner 508 extending therein. A gas line 510 provides fuel as regulated by a fuel valve 512 to the burner 508. An electrically powered combustion air fan 514 supplies combustion air to the burner 508 and forces combustion gases through heater 504 and into an exhaust stack 516.

High pressure, hot water exits the heating element 506 through a supply line 518 and is provided to an expander 520, which is operably coupled to a generator 522. Hot water and/or steam exiting the expander 520 passes through a three-way, electrically operated, valve 524 and is delivered to a heat exchanger 526. The heat exchanger 526 includes a water chamber 530 and a condensing coil 528 disposed therein. The water chamber 530 includes a water inlet line 530a for receiving water to be heated and a water outlet line 530b which may be connected to a plurality of radiators or other heat transfer devices (not shown) disposed within the space being heated. An electrically driven secondary water pump 532 may be disposed within the water inlet line 530a for forcing water through the water chamber 530 and into the corresponding radiators. A series of return water pipes (not shown) convey cooled water exiting the radiators to the water inlet line 530a.

Condensate exiting the coil 528 of the heat exchanger 526 flows back to the water heater 504 through a return line 534. A high pressure pump 536, preferably disposed within the return line 534, maintains the water flowing through element 506 of heater 504 at a high pressure (e.g., in excess of 100 psia). Pump 536 is preferably powered by an electric pump motor 538. A controller 540 is operably connected to the generator 522, valve 524, secondary water pump 532, high pressure pump motor 538 and a battery 542, as shown by dashed lines 544. As described below, controller 540 governs the operation of the cogeneration system 500 and provides electric power to the corresponding home or building via electric outlet line 544a. Controller 540 is preferably coupled to a thermostat (not shown) disposed in the space being heated.

During operation, controller 540 activates combustion fan 514 and pump motor 538 and opens the fuel valve 512. As described above with reference to FIG. 4, the controller 540 may obtain the necessary electrical power from the battery 542 or the electric utility grid via line 544a. Water heater 504, burner 508 and element 506 are similarly configured to heat the high pressure water to a temperature near the boiling point for the corresponding operating pressure (e.g., 500 psia). High pressure, hot water exits the heater 504 at supply line 518 and enters the expander 520, causing it to spin and run the generator 522. Again, the expander 520 is coupled to the generator 522 by suitable means, e.g., a drive shaft, belt, etc. Electrical power from the generator 522 is provided to the controller 540.

Hot water and steam exiting the expander 520 is then provided to the heat exchanger 526 and flows through the condensing coil 528 heating the water disposed in water chamber 530. The controller 540, utilizing electric power supplied by the generator 522, also activates the secondary water pump 532, which, in turn, forces cool water into the chamber 530 and drives heated water from the water chamber 530 and into the radiators or other heat transfer devices disposed within the building. Condensate exiting the coil 528 flows back to the water heater 504 via return line 534. Secondary water pump 536 maintains the water pressure in the heater 504 at the desired high operating pressure (e.g., 500 psia). It should be understood that the water supply flowing through the water heater 504, expander 520 and coil 528 is completely separate from the water supply flowing through the water chamber 530 and the radiators.

Similar to system 400 of FIG. 4, the cogeneration system 500 may also be configured to heat a domestic supply of water. Specifically, a feed pipe 546 may be connected to the valve 524 so as to divert some or all of the water or steam exiting the expander 520 to a water tank coil 548 disposed in a hot water tank 550. A return pipe 552 transfers condensate exiting the tank coil 548 to the return line 534. Water to be heated is provided to the tank 550 via an inlet 554 and heated water may be drawn out of the tank 550 through an outlet 556. The valve 424, under operation of the controller 540, preferably adjusts the flow of hot water and steam being provided to the tank coil 548.

Figure 6:
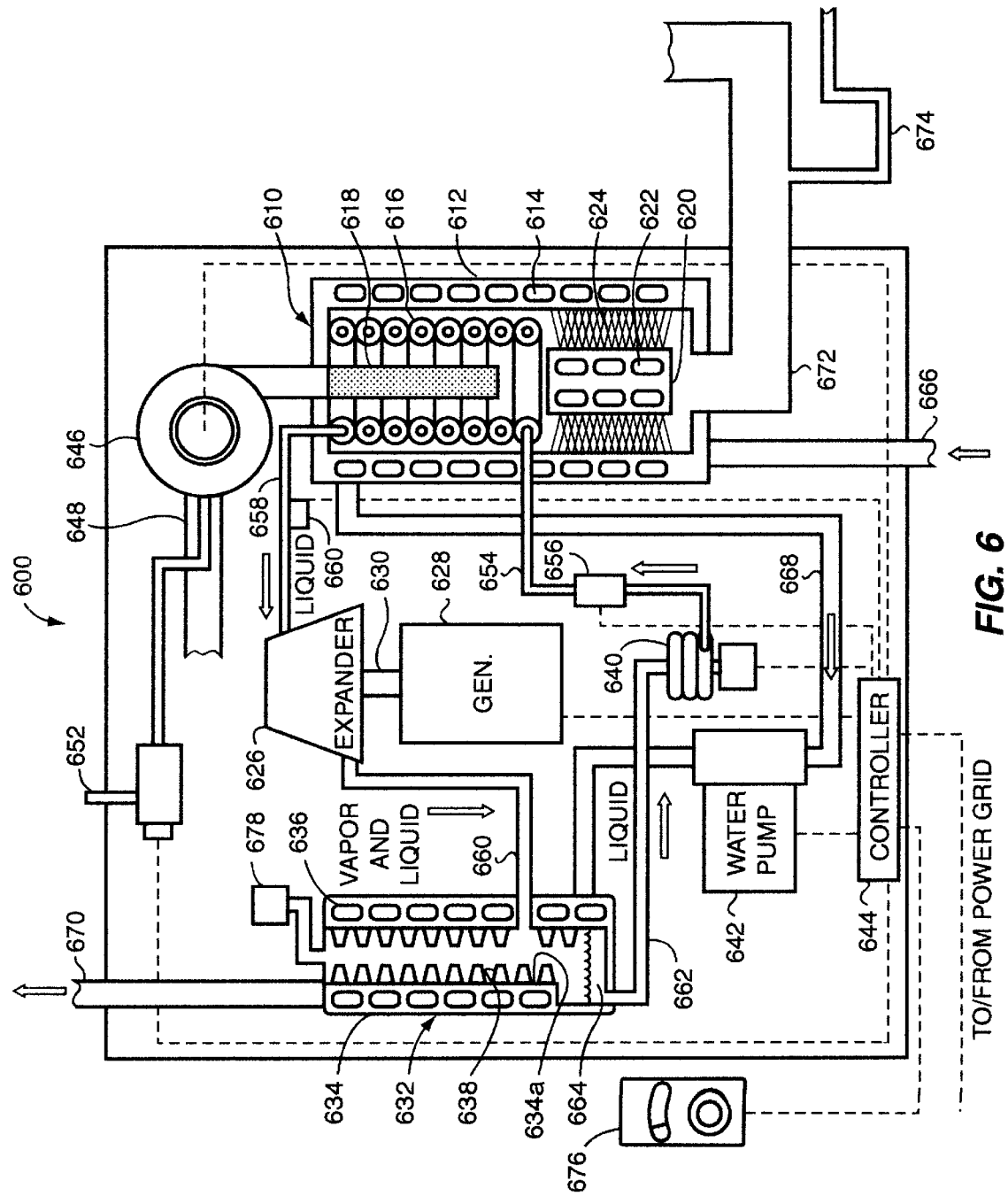
FIG. 6 is a block diagram of still another embodiment of a small-scale cogeneration system.

FIG. 6 is a block diagram of another embodiment of a small-scale cogeneration system 600. The system 600 includes a heat exchanger 610 having an outer casing 612. Within the outer casing 612 is one or more interconnected passageways 614. Disposed inside the heat exchanger 610 is a high pressure heat transfer element 616, which may be a hollow coil having outwardly extending fins to aid in the heat transfer process. Extending at least partially into the heat exchanger 610 is a burner 618. In particular, the heat transfer element 616 and the burner 618 may be arranged within the heat exchanger 610 so that element 616 surrounds at least a portion of the burner 618. An internal structure 620, having a passageway 622 that is connected to passageways 614, may also be provided within the heat exchanger 610. Structure 620 may be disposed downstream of the heat transfer element 616 relative to the burner 618. As shown, a plurality of connecting fins 624 may be provided between the interior surface of the casing 612 and the internal structure 620 to further aid in the heat transfer process, as described below.

In addition to the heat exchanger 610, the system 600 further includes an expander 626 and an electric generator 628 that is operatively coupled thereto (e.g., by a drive shaft 630). A condenser 632 having an outer condenser jacket 634 that defines an inner surface 634a may also be provided. Formed within the condenser jacket 634 is at least one interconnected condenser passageway 636. A plurality of inwardly extending posts 638 may be mounted to the inner surface 634a so as to increase the surface area thereof. The system 600 further includes a high pressure pump 640, a hydronic water circulation pump 642 and a controller 644 for governing the operation of the system 600. A combustion blower 646 may be included for providing pressurized combustion air received via an inlet air pipe 648 to the burner 618. A fuel regulating valve 650 receives fuel (e.g., natural gas) from a fuel supply line 652 and provides it to the burner 618.

The high pressure pump 640 delivers a power generation fluid (e.g., water) at a high pressure (e.g., in excess of 100 psia and preferably at 500 psia) to the heat transfer element 616 via a first high pressure line 654, which may include a flow switch 656 for confirming the flow of fluid. A second high pressure line 658 connects the heat transfer element 616 to the expander 626 so that heated fluid from element 616 may be provided to the expander 626. A temperature/pressure sensor 660 that is connected to controller 644 may be disposed within second line 658. Another line 660 connects the expander 626 to the interior of the condenser 632, while a fourth line 662 connects a sump 664 located at the base of the condenser 632 to the high pressure pump 640, thus defining a closed power fluid circulation path.

A water inlet pipe 666 is coupled to the heat exchanger 610 so as to permit water to flow through the interconnected passageways 614. An intermediary water pipe 668 to which water pump 642 is mounted connects the passageways 614 of the heat exchanger 610 to the condenser passageways 636. An outlet water pipe 670 also connects to the condenser passageways 636. The system 600 may also include a flue exhaust 672 extending from the heat exchanger 610. Disposed within the flue exhaust 672 may be a flue condensate trap 674. A thermostat 676 that is connected to the controller 644 may be provided in the corresponding space being heated.

In operation, the controller 644 receives a call for heat from the thermostat 676 and, in response, activates the electrically powered high pressure pump 640 to which it is operatively connected. As described, electric power for starting the system 600 may come from a battery or the electric power grid. The pump 640 provides high pressure fluid (e.g., water at approximately 500 psia) to the heat transfer element 616. For a cogeneration system capable of supplying approximately 100,000 Btu/hr. of heat energy, the flowrate is around 0.5 gallons/minute. Upon confirming the flow of water through line 654 by means of the flow switch 656, the controller activates the burner 618. In particular, controller 644 activates combustion blower 646 and operates fuel valve 650, thereby providing fuel and pressurized combustion air to the burner 618. The fuel-air mixture formed by burner 618 is ignited, thereby heating the high pressure fluid flowing through element 616. This hot, high pressure fluid exits the heat transfer element 616 and flows to the expander 626 through line 658.

The expander 626 extracts mechanical energy from the hot, high pressure fluid so as to rotate shaft 630 and run the generator 628. As described above, extraction of mechanical energy results in a portion of the hot, high pressure water being flashed to vapor (e.g., steam). The resulting vapor and liquid phases of the working fluid, which may be at or below atmospheric pressure, enter the condenser 632 via the third line 660. The vapor portion of the working fluid condenses on the cooler inner surface 634a of the condenser jacket 634 and collects at the sump 664. This liquid is then provided to the high pressure pump 640 via fourth line 662 so as to complete the cycle. By running the generator 628, a supply of electrical power is provided which exceeds the power needed to operate the system 600. This excess electrical power may be made available to the corresponding home or building.

In addition to providing a supply of electrical power, system 600 also produces heat energy. Specifically, secondary water to be used for local space heating purposes is supplied to the system 600 via water inlet pipe 666. The secondary water is drawn through the system 600 by the hydronic circulation pump 642 which is operated by the controller 644. More specifically, the secondary water initially flows through passageways 614 and 622 at the heat exchanger 610. The flow of relatively cool secondary water through the passageways 614 and 622 serves two functions. First, it keeps the heat exchanger 610 from overheating. Second, it improves overall efficiency by pre-heating the secondary water. As the combustion gases from burner 618 flow past the connecting fins 624, useful heat remaining in the combustion gases is transferred to the secondary water supply flowing through passageways 622 in internal structure 620, thereby extracting additional heat from the combustion process.

Pre-heated secondary water next flows into the condenser 632. In particular, the secondary water flows through the passageways 636 of condenser jacket 634, which is preferably adjacent to or otherwise in heat transfer proximity to the two-phase working fluid. As it circulates through the passageways 636, the secondary water is further heated as a result of the condensing of the vapor and the flow of working fluid within the interior of the condenser 632. Preferably, hydronic water pump 642 circulates secondary water through the condenser passageways 636 at a flowrate that maintains the condenser 632 at a temperature below 212° F. By keeping the condenser 632 below this temperature, a vacuum pressure may be formed within the condenser 632, thereby maximizing the pressure differential across the expander 626 and improving its power extraction capabilities. Heated secondary water exits the condenser 632 through water outlet pipe 670 and is available for space heating purposes. That is, the heated secondary water may be delivered to a plurality of forced hot water radiators (not shown) dispersed throughout the corresponding space and/or to a domestic water heating component (not shown).

The controller 644 preferably includes conventional circuitry to perform several functions in addition to overall control of the system 600. These additional functions include confirming the flow of working fluid from pump 640 before activating the burner 618 and/or fuel valve 650, monitoring the temperature and pressure of the working fluid being input to the expander 626 (via sensor 660) so as to ensure that the system 600 is operating within its temperature and pressure limits, monitoring the electrical power output of the generator 628 and adjusting the operating characteristics of the pump 640, fuel valve 650, burner 618, combustion blower 646 and secondary water pump 642 to meet the particular demands for heat and electrical power within the corresponding space. In particular, by adjusting the operating characteristics of the pump 640, the combustion air blower 646 and/or the fuel valve 650, the controller 644 can regulate the electrical power output of the generator 628. Due to the rapid thermal response of the output of heating element 616 to changes in burner firing rate and/or water flowrate, the controller 644 may quickly increase or decrease the electrical output of the system 600 by simply changing the pressure generated by pump 640 and/or the firing rate of the burner 618

The condenser 632 may further include a vent 678 for eliminating air and other non-condensable gases that may be present in the system 600 during start-up or that may accumulate in the system 600 during operation. The vent 678 may be thermostatically or actively operated to remove such gases. Similarly, condensation of water vapor that may occur in heat exchanger 610 and/or flue exhaust 672 during operation of the system 600 may be removed by trap 674.

The heat exchanger 610 is preferably formed from an aluminum casting alloy. Alloys of aluminum, silicon, and magnesium provide optimum material characteristics for the manufacture and operation of heat exchanger 610. For example, the aluminum alloy commonly known as 356 is particularly useful. These alloys provide desirable thermal conductivity, which is important for achieving high heat transfer performance in a compact design, are lightweight and generally low-cost. The alloys can also be readily formed into intricate hollow-section shapes by casting into sand or permanent molds. Furthermore, the alloys have improved resistance to the corrosive effects of acid flue condensate which is often deposited on the surface. Other materials that have traditionally been used in the construction of fired heaters such as mild or alloy steel, cast iron, or copper alloys are generally less efficient in either thermal properties, corrosion resistance, cost, weight, or ease of fabrication.

FIG. 7 is a block diagram of another cogeneration system 700 having an integrated condenser/heat exchanger unit which has been designated generally 702. The integrated unit 702 includes an outer condenser section 704 and an inner heat exchanger section 706 that are preferably separated by a dividing wall 708 having one or more interconnected passageways 710 formed therein. The dividing wall 708 includes an outer surface 708a extending along the condenser section 704 and an inner surface 708b extending along the heat exchanger section 706. A plurality of posts 712 are preferably mounted to and extend away from the outer surface 708a of the dividing wall 708 so as to increase the surface area thereof.

The integrated condenser/heat exchanger unit 702 is preferably formed from an aluminum casting alloy. As described for heat exchanger 610 (FIG. 6) of system 600, alloys of aluminum, silicon, and magnesium provide optimum material characteristics for the manufacture and operation of the integrated condenser/heat exchanger 702.

Mounted within the heat exchanger section 706 is a high pressure heat transfer element 714, which may be a hollow coil having outwardly extending fins. A burner 716 extends at least partially into the heat exchanger section 706. Preferably, the burner 716 extends centrally within the coil of the heat transfer element 714. An internal structure 718, having passageways 720 that are connected to the dividing wall passageways 710, may also be provided. Structure 718 may be disposed downstream of the heat transfer element 714 relative to the burner 716. A plurality of connecting fins 722 may extend between the inner surface 708b of the wall 708 and the internal structure 718. A flue exhaust 724 is connected to the heat exchanger section 706 of the integrated unit 702 so as to remove combustion gases therefrom. The flue exhaust 724 may be coupled to a vent or chimney (not shown).

The cogeneration system 700 further includes a high pressure pump 726, an expander 728 and a generator 730. The expander 728 is preferably coupled to the generator 730 by a drive shaft 732 so as to run the generator 730. In addition, the pump 726 is connected to the heat transfer element 714 by a first high pressure line 734. A second high pressure line 736 connects the heat transfer element 714 to the expander 728. A third line 738 connects the expander 728 to the condenser section 704 of the integrated unit 702. A fourth line 737 may connect a sump area 739 of the condenser section 704 of the integrated unit 702.

The system 700 may further include a combustion air blower 740 for providing pressurized combustion air from an inlet air pipe 742 to the burner 716. Fuel from a supply line 746 is provided to the burner 716 by a fuel regulating valve 744. A water inlet pipe 748 connects to the passageways 710 of the wall 708 and/or the passageways 720 of the internal structure 718. A hydronic secondary water pump 750 may be disposed at the water inlet 748. An outlet water pipe 752 similarly connects to the passageways 710. Operation of the system 700, as described below, is preferably governed by a controller 754, operatively connected to the high pressure pump 726, the generator 730, the fuel valve 744, the combustion air blower 740 and the hydronic secondary water pump 750.

Controller 754 monitors the operation of the cogeneration system 700 through a series of sensors coupled thereto. In particular, a flow switch 756 mounted in the first line 734 may provide proof-of-flow signals to the controller 754. A temperature/pressure sensor 758 located in second line 736 provides additional information to the controller 754. A thermostat 760 located in a space being heated (not shown) may provide calls to the cogeneration system 700. The controller 754, which provides the same functionality as described above with regard to controller 644, may similarly be coupled to the local power grid for receiving and/or providing power thereto.

The operation of cogeneration system 700 is similar to the operation of system 600 (FIG. 6) and, therefore, will not be described in detail. In general, high pressure fluid is provided by electrically powered pump 726 to element 714 in the heat transfer section 706 of the integrated unit 702. The high pressure fluid is heated to nearly its saturation point by operation of burner 716 and is supplied to the expander 728 which extracts mechanical energy from this hot, high pressure fluid in order to run the generator 730. The two phase working fluid exiting the expander 732 is then provided to the condensing section 704 of the integrated unit 702 where the vapor portion condenses and is collected at sump 739.

Secondary water for use in heating the corresponding space enters the system 700 at inlet water pipe 748 and flows through the passageways 710 and 720 of the dividing wall 708 and the internal structure 718, respectively. As the working fluid condenses in the condenser section 704 heat is transferred to the secondary water supply circulating through the passageways 710, 720. This circulation of secondary water similarly tends to cool the heat exchanger section 706 of the integrated unit 702. Heated secondary water is then available for space heating and/or domestic water heating purposes via water outlet pipe 752. In addition, controller 754 includes conventional circuitry for monitoring and adjusting the operation of the cogeneration system 700 to ensure that it remains within acceptable operating limits and produces the requisite heat and electrical energy demanded by the corresponding space.

It should be understood that other arrangements for transferring the latent heat of the two-phase fluid exiting the expander to the secondary water supply may also be utilized.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A small-scale cogeneration system for providing heat and electrical power, the system having a working fluid, which may be subjected to a high pressure and heated, and a generator for producing electrical power from the energy present in the high pressure, heated working fluid, the system comprising:

a source of expanded working fluid in liquid and vapor phase;

a condenser connected to receive the source of expanded working fluid in liquid and vapor phase;

means for circulating a secondary water supply in proximity to the liquid and vapor phase of working fluid in the condenser allowing the secondary water to be heated as the working fluid condenses; and a controller for governing the operation of the cogeneration system, the controller connected to the generator for receiving and monitoring electrical power output from the generator, the controller configured and arranged to cause the source of expanded working fluid in liquid and vapor phase to be received at the condenser, wherein the condenser includes an outer jacket and the circulating means comprises:

at least one passageway extending inside the jacket; and a secondary water pump coupled to the at least one passageway and configured to convey secondary water through the passageway.

2. A small-scale cogeneration system for providing heat and electrical power, the cogeneration system comprising:

a pump for providing a supply of high-pressure working fluid;

a heat exchanger having an interior;

a heat transfer element disposed within the interior of the heat exchanger, the heat transfer element connected to the pump for receiving the high pressure working fluid;

a burner extending at least partially within the heat exchanger so as to heat the high pressure working fluid within the heat transfer element;

an expander connected to the heat transfer element for receiving hot, high pressure working fluid, the expander configured to extract mechanical energy from the working fluid by expanding the working fluid to a liquid and vapor phase;

an electric generator operatively coupled to the expander, the generator being powered by the mechanical energy extracted from the working fluid;

a condenser connected to the expander for receiving the liquid and vapor phase of the expanded working fluid;

means for circulating a secondary water supply in proximity to the liquid and vapor phase of the expanding working fluid allowing the secondary water to be heated as the working fluid condenses; and means for returning condensate from the condenser to the pump, wherein the condenser includes an outer jacket and the circulating means comprises:

at least one passageway extending inside the jacket; and a secondary water pump coupled to the at least one passageway and configured to convey secondary water through the passageway, further wherein the heat exchanger further includes an outer casing and at least one interconnected passageway extends through the casing and the cogeneration system further comprises means for circulating secondary water through the at least one passageway of the heat exchanger casing.

3. The cogeneration system of claim 2 further comprising:

an inlet water pipe connected to a first end of the at least one passageway in the heat exchanger casing;

an intermediary water pipe connected to a second end of the at least one passageway in the heat exchanger casing and to a first end of the at least one passageway in the condenser jacket; and an outlet water pipe connected to a second end of the at least one passageway in the condenser jacket, wherein the secondary water pump is disposed in the water inlet pipe.

4. The cogeneration system of claim 3 further comprising:

a combustion air blower for providing combustion air to the burner; and a fuel valve for regulating the delivery of a fuel to the burner.

5. The cogeneration system of claim 4 further comprising a controller for governing the operation of the cogeneration system, the controller being operatively coupled to the pump, fuel valve and combustion air blower and connected to the generator for receiving and monitoring electrical power output from the generator, the controller configured and arranged to activate the pump, fuel valve and combustion air blower, in response to a call for heat, causing high pressure fluid in the heat transfer element to be heated and provided to the expander.

6. The cogeneration system of claim 5 wherein the controller further includes circuitry for adjusting the electrical power output of the generator by modifying the operating characteristics of at least one of the pump, fuel valve and combustion air blower.

7. The cogeneration system of claim 6 wherein the controller provides excess electrical power produced by the generator to a corresponding building.

8. The cogeneration system of claim 7 wherein the working fluid is water.

9. The cogeneration system of claim 8 wherein the pump is configured to produce water at approximately 500 psia, the heat exchanger is configured to heat the high pressure water to approximately 470° F. and the expander is configured to expand the hot, high pressure water to approximately 7 psia.

10. The cogeneration system of claim 9 wherein the excess electrical power produced by the generator is in the range of 1 to 20 kilowatts.

11. The cogeneration system of claim 10 wherein the casing of the heat exchanger defines an inner wall and the cogeneration system further comprises:
an internal structure disposed within the interior of the heat exchanger downstream of the heat transfer element relative to the burner;
a plurality of interconnecting fins extending between the inner wall of the heat exchanger and the internal structure; and
at least one passageway extending within the inner structure and connected to the at least one passageway in the heat exchanger casing.

12. The cogeneration system of claim 11 wherein the condenser jacket defines an inner surface and a sump and the vapor phase of the working fluid received at the condenser condenses along the inner surface and collects at the sump.

13. The cogeneration system of claim 12 wherein the condenser includes a plurality of posts extending from the inner surface.

14. The cogeneration system of claim 13 wherein the heat exchanger is formed from an aluminum alloy.

15. The cogeneration system of claim 14 wherein the aluminum alloy used to form the heat exchanger comprises aluminum, silicon and magnesium.

16. A small-scale cogeneration system for providing heat and electrical power, the cogeneration system comprising:
a pump for providing a supply of high-pressure working fluid;
an enclosed integrated heat exchanger/condenser unit having an outer casing and an intermediary dividing wall defining a condensing section between the dividing wall and the outer casing and a heat exchanger section inside of the dividing wall;
a heat transfer element disposed within the heat exchanger section of the integrated unit, the heat transfer element connected to the pump for receiving the high pressure working fluid;
a burner extending at least partially into the heat exchanger section of the integrated unit so as to heat the high pressure working fluid within the heat transfer element;
an expander connected to the heat transfer element for receiving hot, high pressure working fluid, the expander configured to extract mechanical energy from the working fluid by expanding the working fluid to a liquid and vapor phase;
an electric generator operatively coupled to the expander, the generator being powered by the mechanical energy extracted from the working fluid;
a line connecting the expander to the condensing section of the integrated unit;
at least one passageway extending inside the dividing wall;
means for circulating a secondary water supply through the at least one passageway allowing the secondary water to be heated as the working fluid condenses; and
means for returning condensate from the condenser to the pump,
wherein the circulating means comprises:
an inlet water pipe connected to a first end of the at least one passageway;
an outlet water pipe connected to a second end of the at least one passageway; and
a secondary water pump disposed in either the inlet water pipe or the outlet water pipe.

17. The cogeneration system of claim 16 further comprising:
a combustion air blower for providing combustion air to the burner; and
a fuel valve for regulating the delivery of a fuel to the burner.

18. The cogeneration system of claim 17 further comprising a controller for governing the operation of the cogeneration system, the controller being operatively coupled to the pump, fuel valve and combustion air blower and connected to the generator for receiving and monitoring electrical power output from the generator, wherein the controller is configured and arranged to activate the pump, fuel valve and combustion air blower, in response to a call for heat, causing high pressure fluid in the heat transfer element to be heated and provided to the expander.

19. The cogeneration system of claim 18 wherein the controller further includes circuitry for adjusting the electrical power output of the generator by modifying the operating characteristics of at least one of the pump, fuel valve and combustion air blower.

20. The cogeneration system of claim 19 wherein the controller provides excess electrical power produced by the generator to a corresponding building.

21. The cogeneration system of claim 20 wherein the working fluid is water.

22. The cogeneration system of claim 21 wherein the pump is configured to produce water at approximately 500 psia, the heat exchanger section of the integrated unit is configured to heat the high pressure water to approximately 470° F. and the expander is configured to expand the hot, high pressure water to approximately 7 psia.

23. The cogeneration system of claim 22 wherein the excess electrical power produced by the generator is in the range of 1 to 20 kilowatts.

24. The cogeneration system of claim 23 wherein the heat exchanger section of the integrated unit comprises:
an internal structure disposed downstream of the heat transfer element relative to the burner; and
a plurality of interconnecting fins extending between the dividing wall and the internal structure,
wherein the internal structure has at least one passageway connected to the at least one passageway in the heat exchanger casing.

25. The cogeneration system of claim 24 wherein the integrated heat exchanger/condenser unit is formed from an aluminum alloy.

26. The cogeneration system of claim 25 wherein the aluminum alloy used to form the integrated heat exchanger/condenser unit comprises aluminum, silicon and magnesium.

27. A method for small-scale cogeneration of heat and electrical power, the method comprising the steps of:
producing a supply of high pressure working fluid;
heating the supply of high pressure working fluid to near its saturation point;
extracting mechanical energy from the heated, high pressure working fluid;
utilizing the extracted mechanical energy to produce electrical power; and
following the step of extracting, transferring at least a portion of the latent heat remaining in the working fluid to a space heating medium,
wherein the step of extracting comprising the step of expanding the heated high pressure working fluid to a lower pressure two-phase fluid.

28. The method of claim 27 wherein the space heating medium is a secondary supply of water and the step of transferring includes the step of condensing at least a portion of the two-phase fluid in proximity to the secondary water supply.

29. The method of claim 27 wherein the space heating medium is air and the step of transferring includes the step of condensing at least a portion of the two-phase fluid in proximity to the air.

30. The method of claim 29 wherein the working fluid is produced at approximately 500 psia, heated to approximately 470° F. and expanded to approximately 7 psia.

31. A space heating system having a boiler for producing low pressure steam, an expander connected to the boiler and configured to extract rotary mechanical energy from the steam, a condenser connected to the expander and configured to condense steam exiting the expander, means for returning condensate to the boiler, and a fan powered by the mechanical energy extracted by the expander and configured to move room air to be heated past the condenser, the heating system comprising:

a magneto disposed at the expander and configured to generate an alternating current electrical output;

a controller connected to the magneto and including circuitry to convert the alternating current to direct current electrical output; and an electrically powered pump configured to return condensate exiting the condenser to the boiler, the pump connected to the controller, wherein electrical power for operating the pump is supplied by the magneto, wherein a burner extends at least partially into the boiler and an electric fuel valve regulates a flow of fuel to the burner, the fuel valve operatively coupled to the controller, further wherein electrical power to activate the fuel valve is supplied by the magneto.

32. The space heating system of claim 31 further comprising an electrically powered valve for regulating the flow of steam from the expander to the condenser, the valve connected to the controller and moveable between an open and a closed position, wherein electrical power for moving the valve is supplied by the magneto.

33. The space heating system of claim 32 wherein the controller, at start up, activates the burner and the condensate pump, while maintaining the steam valve in the closed position.

34. The space heating system of claim 33 wherein the controller moves the steam valve to the open position when the pressure in the boiler exceeds a minimum threshold.

35. The space heating system of claim 34 wherein the heating system further comprises a battery coupled to the controller and further wherein the controller is connected to a local power grid for receiving electrical power, whereby the controller is configured to start the system with electric power from the local grid or, in case of a local power outage, from the battery.

36. The space heating system of claim 35 wherein the controller is configured to recharge the battery with electrical power from the magneto.

37. The space heating system of claim 36 further comprising an electrically powered motor for driving the fan, the motor operatively coupled to the controller, whereby the controller is configured to utilize the motor to drive the fan with electrical power from the local grid when the mechanical energy from the expander is insufficient to power the fan.

38. The space heating system of claim 37 further comprising an evaporator coil disposed in proximity to the fan, the evaporator coil containing a supply of cooled fluid, wherein the controller is configured to utilize the motor to drive the fan with electrical power from the local grid in response to a demand for air conditioning in the corresponding space, forcing room air to be cooled past the evaporator coil.

* * * * *